United States Patent [19]

Shimizu

[11] Patent Number: 4,771,843
[45] Date of Patent: Sep. 20, 1988

[54] MOTOR-OPERATED POWER STEERING APPARATUS

[75] Inventor: Yasuo Shimizu, Saitama, Japan

[73] Assignee: Honda Giken Kogyo Kabushiki Kaisha, Tokyo, Japan

[21] Appl. No.: 97,020

[22] Filed: Sep. 16, 1987

[30] Foreign Application Priority Data

Sep. 16, 1986 [JP] Japan .................................. 61-217808

[51] Int. Cl.$^4$ .............................................. B62D 5/04
[52] U.S. Cl. .................................. 180/79.1; 180/142; 364/424.05
[58] Field of Search ............... 364/424; 180/79.1, 142; 74/388

[56] References Cited

U.S. PATENT DOCUMENTS

| 4,591,014 | 5/1986 | Yasuda | 180/79.1 |
| 4,593,780 | 6/1986 | Saito | 180/79.1 |

FOREIGN PATENT DOCUMENTS 61-91465 6/1986 Japan .

Primary Examiner—John J. Love
Assistant Examiner—Don McGiehan
Attorney, Agent, or Firm—Armstrong, Nikaido, Marmelstein & Kubovcik

[57] ABSTRACT

A motor-operated power steering apparatus comprises an electric motor for generating assistive steering power in a steering force transmitting system, steering force detecting means for detecting the steering force in the steering force transmitting system and generating a steering force signal indicative of the detected steering force, temperature detecting means for detecting the temperature of the steering force transmitting system and generating a temperature signal indicative of the detected temperature, correcting means for correcting the steering force detected by the steering force detecting means based on the temperature detected by the temperature detecting means to determine a corrected steering force, current value determining means for determining a target current value based on the corrected steering force and generating a target current control signal indicative of the determined target current value, and energizing means for supplying a current of the target current value to the motor based on the target current control signal from the current value determining means.

8 Claims, 6 Drawing Sheets

MOTOR-OPERATED POWER STEERING APPARATUS

BACKGROUND OF THE INVENTION

1. Field of the Invention

The present invention relates to a motor-operated power steering apparatus having an electric motor for generating assistive steering power in a steering force transmitting system, and more particularly to a motor-operated power steering apparatus capable of controlling the value of a current supplied to the motor according to the temperature of the motor or other components of the steering force transmitting system.

2. Description of the Relevant Art

There are known motor-operated power steering apparatus having an electric motor for generating assistive steering power in a steering force transmitting system in order to lessen the steering efforts of the driver of a motor vehicle. The motor-operated power steering apparatus control the value of a current supplied to the motor according to steering information such as the steering speed, steering angle, and steering force of the steering wheel or information on the speed of the motor vehicle. The assistive steering power generated by the motor, together with a manual steering force applied to the steering wheel by the driver, is transmitted through a gear mechanism of the steering force transmitting system to dirigible wheels.

The motor-operated power steering apparatus has many heating elements in the steering power transmitting system such as the windings and commutator of the motor, the power transistors for driving the motor, and the sliding members of mechanisms such as a speed reducer. The motor-operated power steering apparatus itself is located in the vicinity of an engine which generates heat, and the ambient temperature around the power steering apparatus varies from season to season. The ambient temperature around the motor-driving power transistors or the mechanisms then tends to change widely, and inevitably increases to quite a high temperature level.

The conventional motor-operated power steering apparatus are designed so that their components such as the motor can withstand high-temperature environments. Under certain special conditions, the motor-operated power steering apparatus are required to operate at temperatures higher than the limit temperature of the components.

Japanese Laid-Open Utility Model Publication No. 61-91465, for example, discloses a motor-operated power steering apparatus designed to protect its components against high-temperature environments. The disclosed motor-operated power steering apparatus comprises a temperature detector for detecting the temperature of the motor, means for ascertaining whether a detected signal from the temperature detector is in excess of a preset temperature range, and means for limiting a current supplied to drive the motor when the temperature of the motor exceeds the preset temperature range. When the motor temperature rises beyond the preset temperature range, the current flowing through the motor is limited to protect the motor.

However, at the time the motor temperature goes above the preset temperature range, the motor current is limited irrespective of how the dirigible wheels are steered. Therefore, when the motor temperature is excessively high, the assistive steering power produced by the motor is lowered regardless of the manual steering force applied to the steering force transmitting system, resulting in a poor steering feeling which the driver has.

SUMMARY OF THE INVENTION

In view of the aforesaid drawbacks of the conventional motor-operated power steering apparatus, it is an object of the present invention to provide a motor-operated power steering apparatus which detects the steering force of a steering force transmitting system and controls a current supplied to a motor based on the steering force as corrected by the temperature of the steering force transmitting system for thereby protecting components, such as the motor, of the steering force transmitting system.

According to the present invention, a motor-operated power steering apparatus comprises an electric motor for generating assistive steering power in a steering force transmitting system, steering force detecting means for detecting the steering force in the steering force transmitting system and generating a steering force signal indicative of the detected steering force, temperature detecting means for detecting the temperature of the steering force transmitting system and generating a temperature signal indicative of the detected temperature, correcting means for correcting the steering force detected by the steering force detecting means based on the temperature detected by the temperature detecting means to determine a corrected steering force, current value determining means for determining a target current value based on the corrected steering force and generating a target current control signal indicative of the determined target current value, and energizing means for supplying a current of the target current value to the motor based on the target current control signal from the current value determining means.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
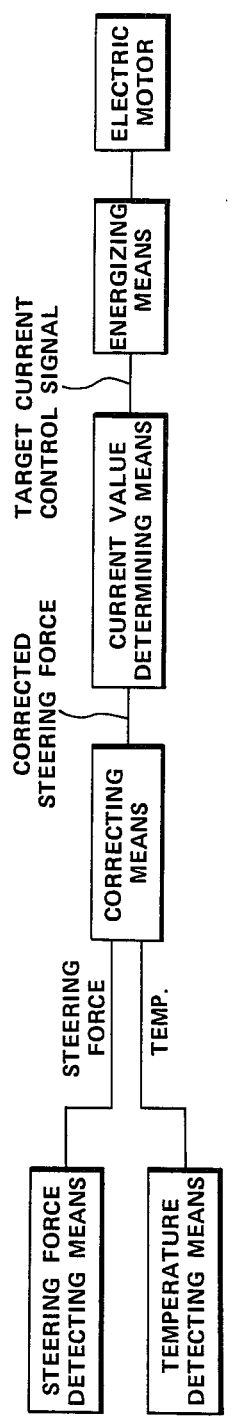
FIG. 1 is a block diagram of a control arrangement of a motor-operated power steering apparatus according to the present invention.

FIG. 1 shows in block form the fundamental concept of a control arrangement of a motor-operated power steering apparatus according to the present invention.

According to the control arrangement of the motor-operated power steering apparatus, the steering force and the temperature of a steering force transmitting system are detected respectively by steering force detecting means and temperature detecting means. The detected steering force is corrected with the detected temperature into a corrected steering force by correcting means. The value of a target current to be supplied to an electric motor for generating assistive steering power is determined by current value determining means based on the corrected steering force. The current value determining means generates a target current control signal indicative of the determining target current value. The target current is then supplied to the motor by energizing means.

Figure 2:
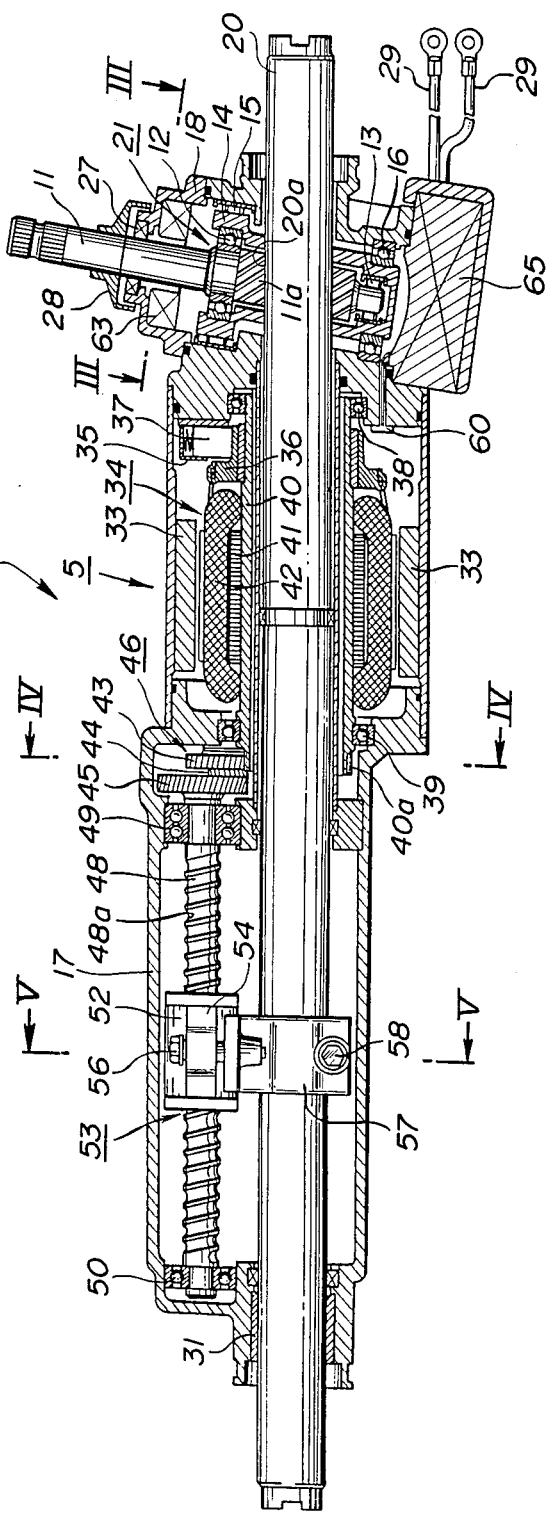
FIG. 2 is a longitudinal cross-sectional view of the motor-operated power steering apparatus of the invention.

FIG. 2 shows the motor-operated power steering apparatus, generally designated by the reference numeral 100. A rack shaft 20 with its opposite ends coupled to dirigible wheels (not shown) through respective tie rods is disposed in and extends through a rack casing 17. The rack shaft 20 is axially movably supported in the rack casing 17 through a rack guide (not shown) near a pinion gear 11a at a righthand end (as shown) of the rack casing 17, and also through a journal bearing 31 in a lefthand end of the rack casing 17.

A pinion shaft 11 coupled to a steering wheel (not shown) through a steering shaft is rotatably supported by a rotatable pinion holder 14 by means of bearings 12, 13. The pinion holder 14 has its central axis offset or displaced from the central axis of the pinion shaft 11. The pinion holder 14 is rotatably supported in an auxiliary casing 18 by means of bearings 15, 16, the auxiliary casing 18 being joined to the righthand end of the rack casing 17.

The pinion gear 11a is fixedly mounted on the pinion shaft 11 and meshes with rack teeth 20a defined on the back of the rack shaft 20.

A steering torque sensor (steering force detecting means) 21 and a control circuit 63 are disposed in an upper portion of the auxiliary casing 18 in which the pinion shaft 11 is disposed. A motor driver circuit 65 is housed in a lower portion of the auxiliary casing 18.

Figure 3:
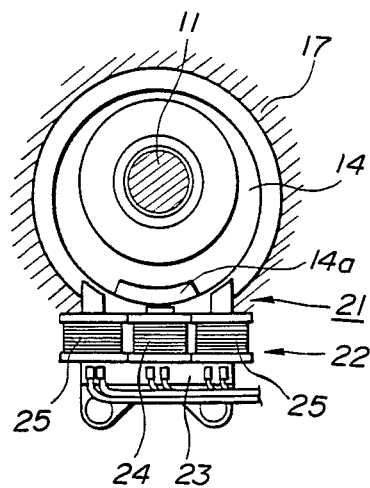
FIG. 3 is a cross-sectional view taken along line III—III of FIG. 2.

As shown in FIG. 3, the steering torque sensor 21 comprises a movable core 14a on an upper surface of the pinion holder 14, and a differential transformer 22 fixed fixedly mounted in the auxiliary casing 18. The differential transformer 22 has an iron core 23 fixedly positioned in the auxiliary casing 18 and having an E shape as viewed in plan, a primary coil 24 wound on the iron core 23, two secondary coils 25 wound on the iron core 23, and a compensating tertiary core (not shown) disposed around the primary coil 24. The steering torque sensor 21 detects a steering torque, i.e., a reactive steering force acting on the steering wheel, through displacement of the movable core 14a. With an AC pulse signal applied to the primary coil 24 from a control circuit 63 (FIG. 6), the secondary coils 25 differentially produce and apply steering torque signals S1, S2 to the control circuit 63 in response to relative displacement between the secondary coils 25 and the movable core 14a upon rotation of the pinion holder 14. A sealing member 27 is disposed around the pinion shaft 11 and supported in the auxiliary casing 18 which is covered with a cap 28. The driver circuit 65 is electrically coupled to a battery power supply (not shown) through power cords 29.

The rack casing 17 houses therein an electric motor 5 disposed centrally around the rack shaft 20 for generating assistive steering power. The electric motor 5 comprises field magnets 33 secured to the inner peripheral surface of the rack casing 17, a rotor 34 rotatably disposed on a central portion of the rack shaft 20, a commutator 36 accommodated in a holder 35 fixed to the rack casing 17, and a brush 37 slidably held against the commutator 36. The rotor 34 is rotatably supported in the rack casing 17 by means of bearings 38, 39, and has a tubular shaft 40 serving as an output shaft of the motor 5. The rotor 34 includes a laminated iron core 41 disposed around the tubular shaft 40 and havnig a skewed groove, and an armature multiplex winding 42 disposed around the laminated iron core 41, the iron core 41 and the winding 42 being coaxially and securely mounted on the tubular shaft 40. The armature winding 42 is electrically connected to the motor driver circuit 65 in a control unit 62 (described later on) through the commutator 36 and the brush 37. The motor driver circuit 65 is controlled by the control circuit 63.

A temperature sensor (temperature detecting means) 60 is attached to an inner wall surface of the rack casing 17 near the motor 5, the temperature sensor 60 being electrically coupled to the control circuit 63. The temperature sensor 60 includes a thermistor with its resistance variable with change in the temperature. The temperature senor 60 thus applies a temperature signal S3 with its voltage substantially proportional to the temperature change to the control circuit 63. Rather than the thermistor, the temperature sensor 60 may comprise a thermocouple or any of various other elements of similar function. The temperature sensor 60 may be located in any of other suitable positions.

Figure 4:
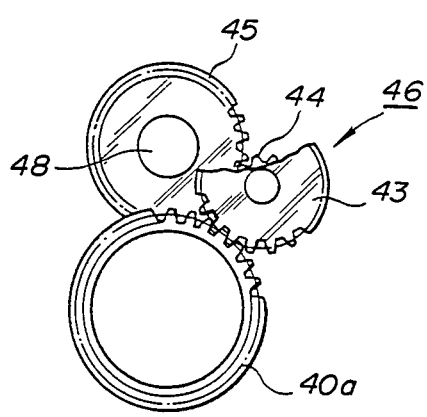
FIG. 4 is a cross-sectional veiw taken along line IV—IV of FIG. 2.
Figure 5:
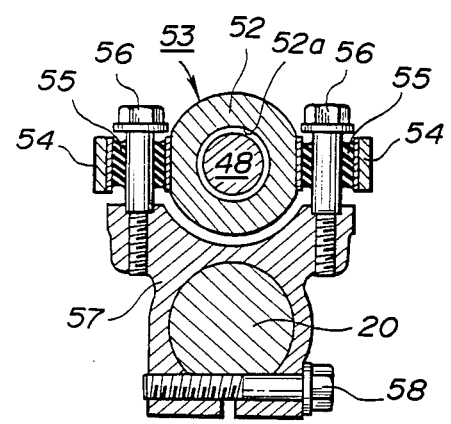
FIG. 5 is a cross-sectional view taken along line V—V of FIG. 2.

A speed reducer 46 comprising gears 40a, 43, 44, 45 is housed in the rack casing 17 at a position leftward (as viewed in FIG. 2) of the motor 5. As shown in FIG. 4, the gear 40a is formed on an outer peripheral surface of the tubular shaft 40, and the smaller-diameter gear 43 is held in mesh with the gear 40a. The smaller-diameter gear 44 integrally coupled to the gear 43 is in mesh with the larger-diameter gear 45 fixed to a screw shaft 48. As illustrated in FIG. 2, the screw shaft 48 is rotatably supported parallel to the rack shaft 20 in the rack casing 17 by means of bearings 49, 50 and has a helical groove 48a defined in its outer peripheral surface over an axial length corresponding to the distance which the rack shaft 20 is axially movable. As shown in FIG. 5, a nut member 52 having a helical groove 52a defined in its inner peripheral surface is threadedly fitted over the screw shaft 48 through a number of balls (not shown). The helical grooves 48a, 52a and the balls jointly constitute a known ball screw mechanism 53 by which the screw shaft 48 and the nut member 52 are coupled in power transmitting relation.

The nut member 52 has a pair of flanges 54 extending in diametrically opposite relation and fixed to a rack holder 57 by means of bolts 56 extending through the flanges 54, respectively, with bushings 55 interposed between the bolts 56 and the flanges 54. The nut member 52 is thus movable only axially in union with the rack shaft 20 which is gripped by the rack holder 57. The rack holder 57 is securely fastened around the rack shaft 20 a bolt 58. The rack shaft 20 is coupled to the nut member 52 by the rack holder 57 through the bolts 56 and the bushings 55. The bushings 55 serve to absorb bending moment acting on the rack shaft 20 in response to a steering reactive force and to prevent unwanted load from being applied to the screw shaft 48 of the ball screw mechanism 53.

Figure 6:
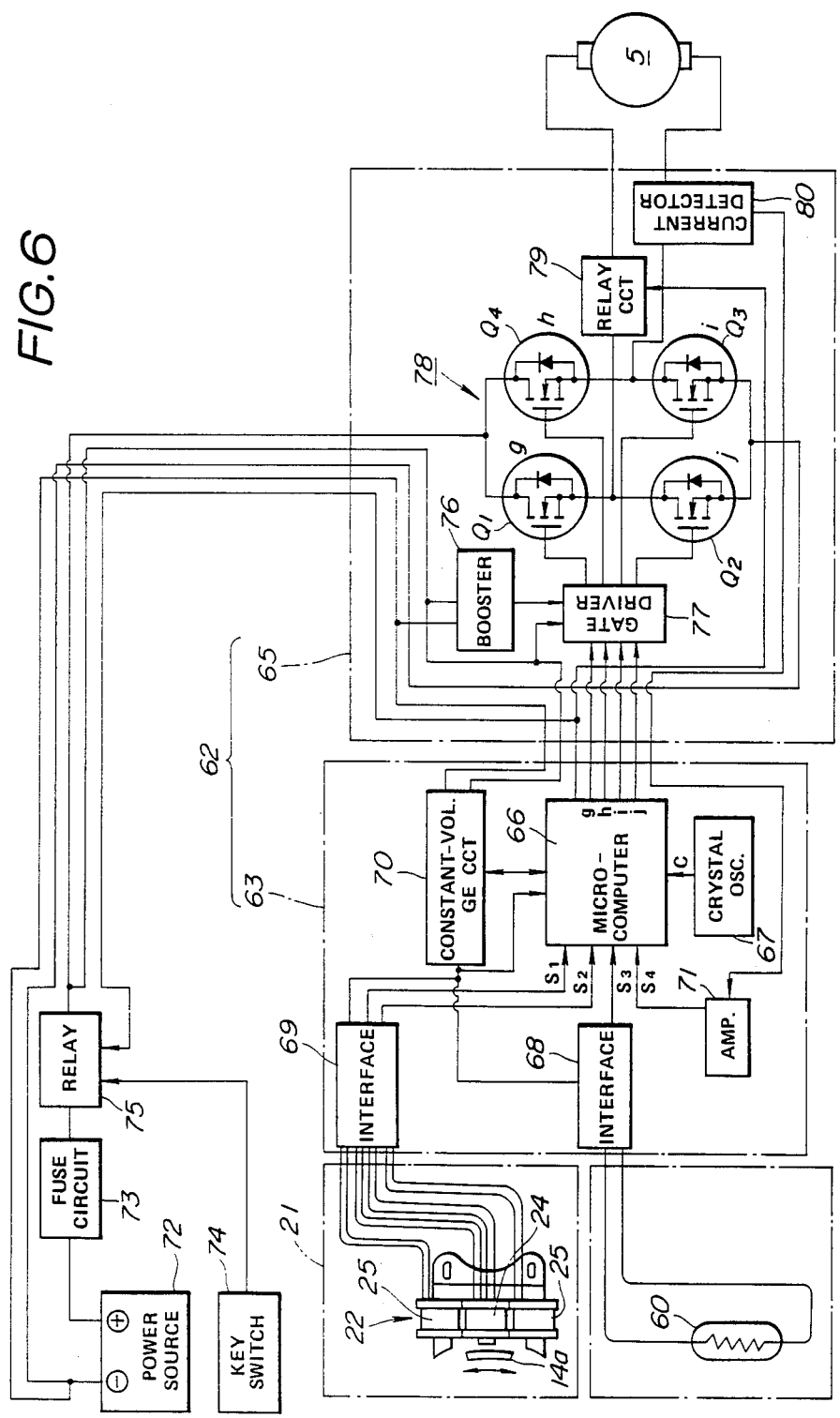
FIG. 6 is a block diagram of an electric circuit of the motor-operated power steering apparatus of the invention.

As illustrated in FIG. 6, the control unit 62 of the motor-operated power steering apparatus according to the present invention comprises the control circuit (including correcting means and current value determining means) 63 and the motor driver circuit (energizing means) 65. The control circuit 63 and the motor driver circuit 65 are connected to a vehicle-mounted battery power source 72 through a relay circuit 75 and a fuse circuit 73, so that the control circuit 63 and the motor driver circuit 65 can be supplied with electric power from the battery power source 72. The relay circuit 75 is connected to a key switch 74 and the control circuit 63 and can be operated thereby to supply and cut off electric power.

The control circuit 63 includes a microcomputer 66, a crystal oscillator 67, an interface 68 for the temperature sensor 60, an interface 69 for the torque sensor 21, a constant-voltage regulated circuit 70, and an amplifier 71. The microcomputer 66 is supplied with a temperature signal S3 from the temperature sensor 60 through the interface 68, steering torque signals S1, S2 from the steering torque sensor 21 through the interface 69, a signal S4 (described later) from the amplifier 71, and a reference clock signal C from the crystal oscillator 67.

The interface 68 for the temperature sensor 60 has a resistance bridge circuit with the temperature sensor 60 as one of the resistors, and an amplifier for amplifying the output from the bridge circuit. The interface 68 thus produces a temperature signal S3 which is indicative of the resistance of the temperature sensor 60, i.e., the temperature $\theta$. The interface 69 for the steering torque sensor 21 converts a reference pulse signal from the microcomputer 66 to an AC signal and supplies the AC signal to the primary coil 24 fo the differential transformer 22. The interface 69 also rectifies and smooths outputs from the secondary coils 25 and tertiary coil of the differential transformer 22 to produce steering torque signals S1, S2 which are representative of the direction and magnitude, respectively, of the steering torque. The amplifier 71 amplifies an output signal from a current detector 80 in the motor driver circuit 68 which is coupled to the motor 5, for thereby producing a signal S4 indicating the value of a current flowing through the motor 5. The constant-voltage regulated circuit 70 generates a constant voltage from the electric power supplied from the relay circuit 75 and applies such a constant voltage to the various circuits in the control circuit 63.

The microcomputer 66 comprises a memory and a processor which processes the signals S1, S2, S3, S4 according to a program stored in the memory to apply pulse-width-modulation signals (PWM signals) g, h, i, j to the motor driver circuit 65. The PWM signals are applied as a target current control signal to the motor driver circuit 65 which then controls the motor 5 by equalizing the current flowing therethrough to the target current.

The motor driver circuit 65 comprises a gate driver 77, a bridge circuit 78 having four field-effect transistors (FETs) Q1, Q2, Q3, Q4, a booster 76, a relay circuit 79, and the current detector 80.

The booster 76 applies a voltage which is at least twice the voltage of the power source to the gate driver 77, which issues drive signals to the respective FETs Q1 through Q4 of the bridge circuit 78 based on the PWM signals g, h, i, j from the microcomputer 66. The FETs Q1, Q4 have drain terminals coupled to the relay circuit 75, and source terminals coupled to the drain terminals of the FETs Q2, Q3. The FETs Q2, Q3 have source terminals connected to one terminal of the power source 72. The motor 5 is connected between the source and drain terminals of the FETs Q1, Q2 and the source and drain terminals of the FETs Q3, Q4. The gate terminals of the FETs Q1, Q2, Q3, Q4 are supplied with the drive signals from the gate driver 77 for simultaneously or selectively turning on the FETs Q1, Q3 or the FETs Q2, Q4 to control the direction and value of a current to be supplied to the motor 5. The bridge circuit 78 supplies the motor 5 with an intermittent current having a duty factor according to the PWM signals g, h, i, j. The PWM signals g, h, i, j are signals corresponding to the duty factors of the FETs Q1, Q4, Q3, Q2, respectively.

The relay circuit 79 is coupled to the microcomputer 66 for connecting and disconnecting the motor 5 and the bridge circuit 78 dependent on an output signal from the microcomputer 66. The current detector 80 detects the value of a current flowing through the motor 5 and applies a signal indicative of the detected current value to the amplifier 71.

Figure 7:
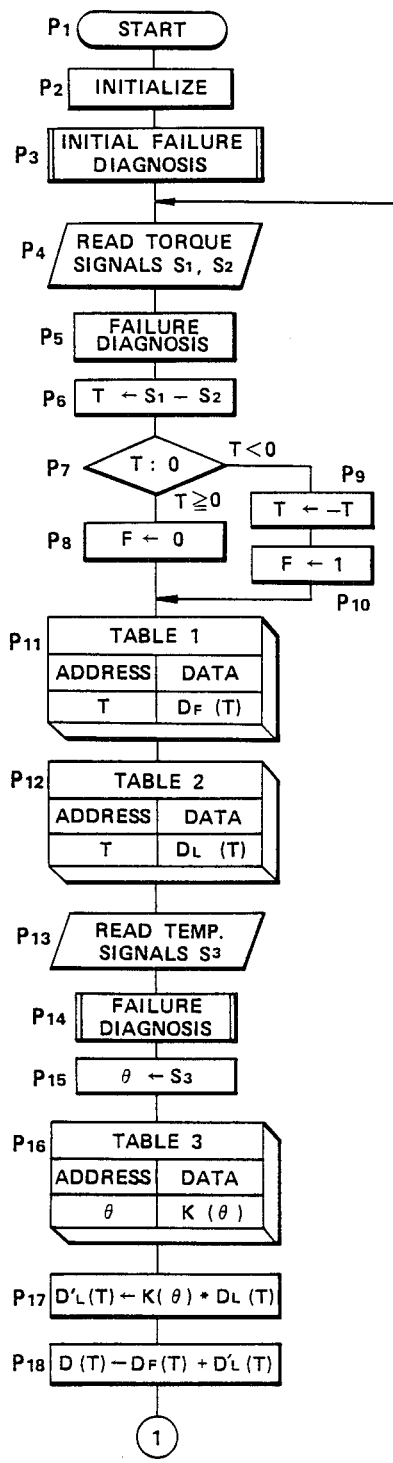
FIG. 7 is a flowchart of a first control sequence of the motor-operated power steering apparatus.
Figure 7:
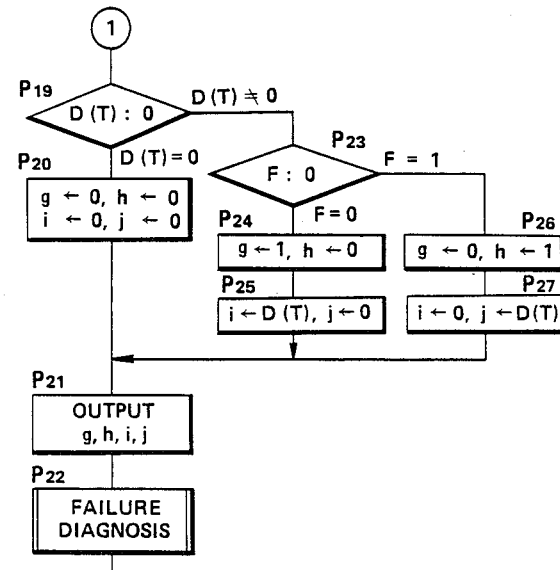
Figure 8:
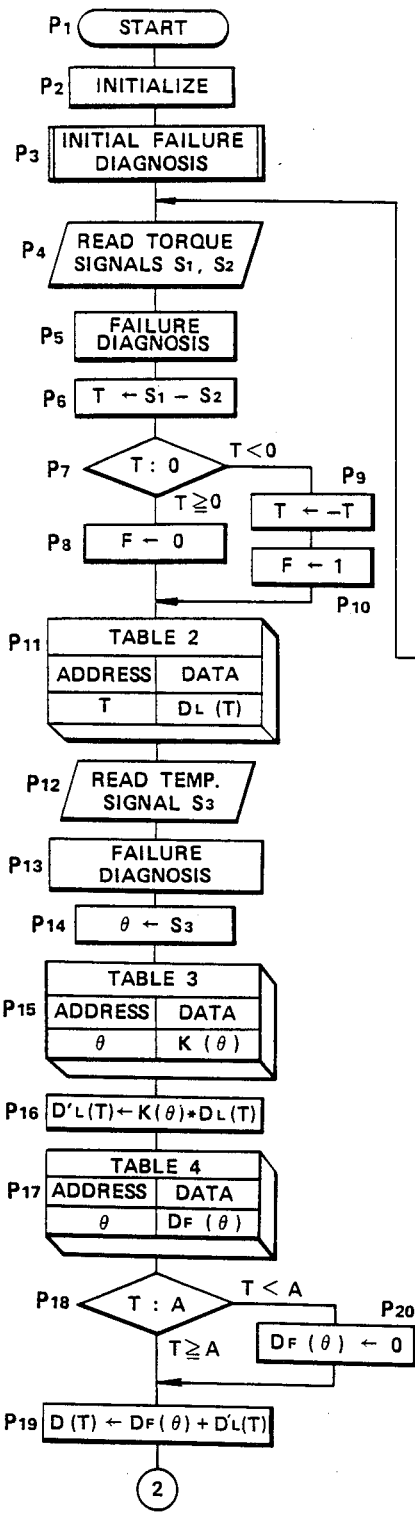
FIG. 8 is a flowchart of a second control sequence of the motor-operated power steering apparatus.
Figure 8:
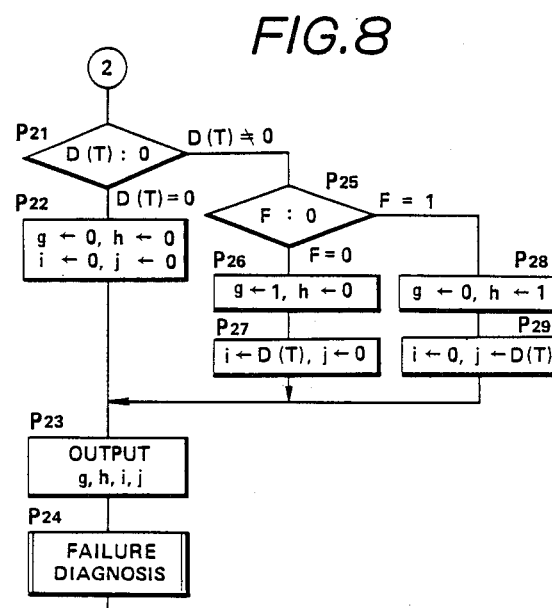

The motor-operated power steering apparatus 100 controls the motor 5 by executing an operation sequence shown by the flowchart of FIG. 7 or 8 in the microcomputer 66.

A first control mode of the motor-operated power steering apparatus 100 will be described with reference to FIG. 7.

When the key switch 74 is turned on by an ignition key that is operated by the drive, the microcomputer 66 and other circuits are supplied with electric power and the microcomputer 66 starts its control operation in a step P1. Then, the microcomputer 66 is initialized to erase stored data from a register and the like thereof in a step P2. Initial failure diagnosis is effected according to a given subroutine in a step P3, and if all circuits in the microcomputer 66 operate normally, control goes from the step P3 to a step P4.

Figure 9:
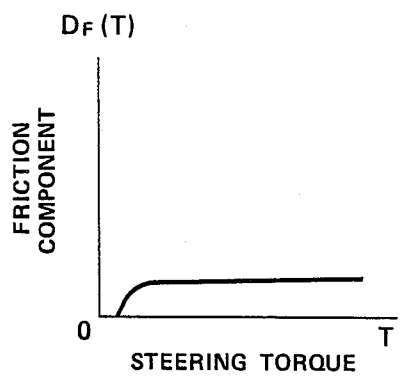
FIG. 9 is a diagram showing a data table used in the control sequences, indicating a steering-torque vs. friction curve.

In the step P4, the steering torque signals S1, S2 are read in. The steering torque sensor 21 is diagnosed for failure according to another subroutine in a step P5. If the steering torque sensor 21 functions normally, then control goes from the step P5 to a step P6 in which the value of the signal S2 is subtracted from the value of the signal S1 to produce an internal signal T (hereinafter referred to as "steering torque T") representative of the steering torque. A next step P6 ascertains whether the steering torque T is positive or negative. If the steering torque T is positive or zero, then a steering direction flag F is set to 0 in a step P8. If the steering torque T is negative, then the sign of the steering torque T is reversed, i.e., the value of the steering torque T is absolutized in a step P9, and the steering direction flag F is set to 0 in a step P10. In a step P11, a friction component DF(T) which corresponds to the steering torque T is retrieved from a data table 1 shown in FIG. 9, and an internal signal indicative of the friction component DF(T) is generated. The friction component DF(T) represents a frictional resistance dependent on the steering force in the steering force transmitting system when the steering torque T is applied. In a next step P12, a road load component DL(T) which corresponds to the steering torque T is retrieved from a data table 2 shown in FIG. 10, and an internal signal indicative of the road load component DL(T) is generated. The road load component DL(T) indicates the resistance applied from the road surface to the dirigible wheels when they are turned. Up to this time, the microcomputer 66 has served as road laod calculating means for calculating a road load component of the steering force in the steering force transmitting system and frictional resistance calculating means for calculating a frictional resistance component in the steering force transmitting system.

Then, the temperature signal S3 is read in a step P13, and the temperature sensor 60 is diagnosed for failure according to another subroutine in a step P14. Control proceeds to a step P15 only when the termperature sensor 60 functions normally.

In the step P15, the temperature signal S3 is converted to an internal signal (hereinafter referred to as "temperature $\theta$") indicative of the temperature $\theta$ in the casing 17. In the next step P16, a temperature coefficient K($\theta$) corresponding to the temperature $\theta$ is retrieved from a data table 3 shown in FIG. 11, and an internal signal (hereinafter referred to as "temperature coefficient K($\theta$)") indicative of the temperature coefficient K($\theta$) is produced.

Figure 11:
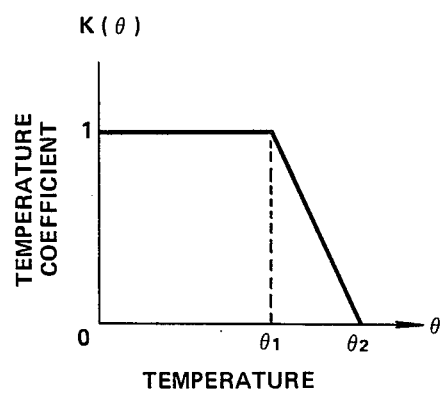
FIG. 11 is a diagram showing a data table used in the control sequence, indicating a temperature vs. temperature-coefficient curve.

As shown in FIG. 11, the temperature coefficient K($\theta$) is 1 when the temperature ranges from 0° C. to a value $\theta$1. Above the temperature $\theta$1, the temperature coefficient K($\theta$) decreases as the temperature $\theta$ increases, and is 0 when the temperature $\theta$ reaches a value $\theta$2 (0° C.<$\theta$1<$\theta$2).

In a step P17, the road load component DL(T) and the temperature coefficient K($\theta$) are multiplied to correct the road load component DL(T) into a corrected road load component D'L(T). In this process, the microcomputer 66 serves as road load correcting means.

A step P18 adds the corrected road load component D'L(T) and the friction component DF(T) to produce a corrected steering force D(T), and generates a signal (hereinafter referred to as "corrected steering force D(T)") which represents the corrected steering force D(T). In this process, the microcomputer 66 serves as corrected steering force determining means. The corrected steering force D(T) indicates the duty factors of the PWM signals g, h, i, j, as described later on.

A step P19 ascertains whether the corrected steering force D(T) is 0 or not. If the corrected steering force D(T) is 0, then the duty factors of the PWM signals g, h, i, j are set to 0 in a step P20, the duty factors of the PWM signals g, h, i, j being indicated by g, h, i, j for convenience in FIG. 7. If the corrected steering force D(T) is in excess of 0, i.e., if it exceeds 0 but is smaller than 0, then control proceeds to a step P23 which checks the value of the flag F. If the flag F is 0, then the duty factors of the PWM signals g, h, i, j are set to 1, 0, D(T), 0, respectively, in steps P24, P25. If the flag F is 1, then the duty factors of the PWM signals g, h, i, j are set to 0, 1, 0, D(T), respectively, in steps P26, P27.

The PWM signals g, h, i, j are applied to the motor driver circuit 65 in a step P21. The motor driver circuit 65 serves as energizing means for supplying an electric current to the motor 5.

Thereafter, the motor 5 is diagnosed for failure based on the output signal from the current detector 80. The process from the step P4 is repeated only when the motor 5 functions normally.

In the motor-operated power steering apparatus of the invention, the road load component DL(T) of the steering force T is corrected according to the temperature $\theta$ of the steering force transmitting system so as to be smaller at high temperature of the steering force transmitting system, and the value of the current supplied to the motor 5 is controlled on the basis of the corrected steering force. Therefore, when the temperature of the steering force transmitting system is high, the heating of the motor 5 and the driver circuit 65 can be suppressed without making a steering feeling worse, and the motor 5 and other devices are prevented from being adversely affected thermally. Even when the temperature of the steering force transmitting system exceeds the temperature $\theta$2, the motor 5 can still produce an assistive force corresponding to the friction component in the steering force transmitting system, so that steering operation to avoid an obstacle in emergency can reliably be carried out.

A second control mode of the motor-operated power steering apparatus 100 will be described with reference to FIG. 7. The second control mode has steps P11 through P19 which are different from those of the first control mode, with the other steps being the same as those of the first control mode. Therefore, only the steps P11 through P19 will be described below.

Figure 10:
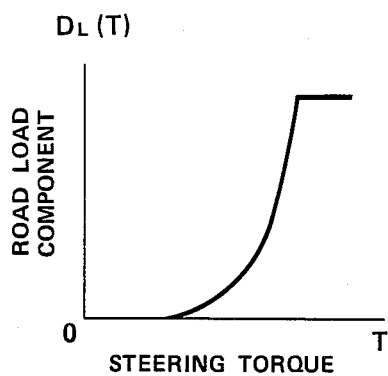
FIG. 10 is a diagram showing a data table used in the control sequences, indicating a steering-torque vs. road-load-component curve.

In a step P11, a road load component DL(T) corresponding to the steering torque T is retrieved from the data table 2 shown in FIG. 10. Then, the temperature signal S3 is read in a step P12, and the temperature sensor 60 is diagnosed for failure in a step P13.

In a step P14, the temperature signal S3 is converted to a temperature $\theta$. Based on the temperature $\theta$, a temperature coefficient K($\theta$) is retrieved from the data table 3 shown in FIG. 11 in a step P15.

Figure 12:
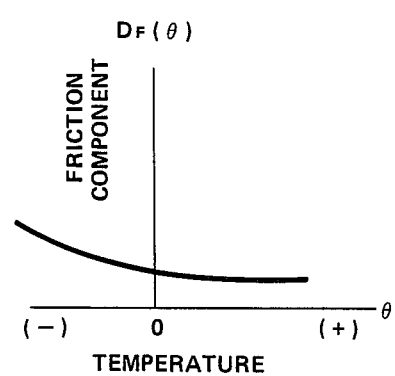
FIG. 12 is a diagram showing a data table used in the control sequences, indicating a temperature vs. friction curve.

In a step P16, the road load component DL(T) and the temperature coefficient K(0) are multiplied to correct the road load component DL(T) into a corrected road load component D'L(T). Then, a friction component DF($\theta$) is retrieved on the basis of the temperature $\theta$ from a data table 4 illustrated in FIG. 12 in a step P17. The friction component DF($\theta$) represents a frictional resistance of the steering force transmitting system irrespective of the steering force T, i.e., a temperature-dependent frictional resistance of the sliding members of the mechanism of the steering force transmitting system which are affected by the viscosity of lubricating oil that varies dependent on the temperature. As shown in FIG. 12, the friction component DF($\theta$) increases as the temperature $\theta$ is lowered. In this process, the microcomputer 66 serves as temperature-dependent frictional resistance calculating means for calculating a frictional resistance of the steering force transmitting system which is generated by the temperature-dependent viscosity of lubricating oil in the steering force transmitting system.

Then, a step P18 ascertains whether or not the steering torque T is equal to or larger than a value A which defines a dead zone. If the steering torque T is equal to or larger than the value A, then control proceeds to a step P19. If the steering torque T is smaller than the value A, the friction component DF(θ) is set to 0 in a step P20, which is followed by the step P19. In the step P19, the corrected road load component D'L(T) and the friction component DF(θ) are added to produce a corrected steering force D(T), which is utilized to determine the duty factors of the PWM signals g, h, i, j in the subsequent steps in the same manner as the first control mode.

In the motor-operated power steering apparatus 100 operating in the second control mode, when the temperature θ is low, i.e., when the frictional resistance is high due to the increased viscosity of the lubricating oil that lubricates the sliding members of the mechanism of the steering force transmitting system, the friction component DF(θ) is increased and so is the assistive force generated by the motor 5. Therefore, the effect of the viscosity of the lubricating oil on the steering force transmitting system because of temperature changes can be eliminated, so that a constant steering feeling can be obtained irrespective of the temperature θ. When the temperature θ is high, the friction component DF(θ) is reduced, and hence the current flowing through the motor 5 is suppressed to reduce the heating of the motor 5 and other elements for protection thereof.

With the motor-operated power steering apparatus according to the present invention, the steering force applied to the steering force transmitting system is corrected by the temperature thereof, and the current supplied to the motor is controlled dependent on the corrected steering force in such a manner that the current will be reduced as the temperature of the steering force transmitting system rises. The amount of heat generated by the motor and other elements can be reduced without impairing the dependence of the motor-generated assistive force on the steering force. The motor can be protected from excessive heat without imparing the steering feeling which the driver has during steering operation.

Though the current supplied to the motor is corrected by the temperature of the steering force transmitting system, it is basically controlled on the basis of the steering force (reactive steering force) of the steering force transmitting system. The steering feeling which the driver gets from the steering wheel during steering operation is not impaired.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A motor-operated power steering apparatus comprising:
   an electric motor for generating assistive steering power in a steering force transmitting system;
   steering force detecting means for detecting the steering force in said steering force transmitting system and generating a steering force signal indicative of the detected steering force;
   temperature detecting means for detecting the temperature of said steering force transmitting system and generating signal indicative of the detected temperature;
   correcting means for correcting the steering force detected by said steering force detecting means based on the temperature detected by said temperature detecting means to determine a corrected steering force;
   current value determining means for determining a target current value based on the corrected steering force and generating a target current control signal indicative of the determined target current value; and
   energizing means for supplying a current of the target current value to said motor based on the target current control signal from said current value determining means.

2. A motor-operated power steering apparatus according to claim 1, wherein said correcting means comprises:
   road load calculating means for calculating a road load component of the steering force in said steering force transmitting system based on the steering force signal from said steering force detecting means;
   first frictional resistance calculating means for calculating a steering-force-dependent frictional resistance component in said steering force transmitting system based on the steering force signal from said steering force detecting means;
   temperature coefficient calculating means for calculating a temperature coefficient dependent on the temperature of said steering force transmitting system based on the temperature signal from said temperature detecting means;
   road load correcting means for calculating a corrected road load component by multiplying the road load component calculated by said road load calculating means and the temperature coefficient calculated by said temperature coefficient calculating means; and
   corrected steering force determining means for determining said corrected steering force by adding the corrected road load component calculated by said road load corrected means and the steering-force-dependent frictional resistance component calculated by said first frictional resistance determining means.

3. A motor-operated power steering apparatus according to claim 1, wherein said correcting means comprises:
   road load calculating means for calculating a road load component of the steering force in said steering force transmitting system based on the steering force signal from said steering force detecting means;
   second frictional resistance calculating means for calculating a temperature-dependent frictional resistance component due to temperature-dependent viscosity of lubricating oil in said steering force transmitting system based on the temperature signal from said temperature detecting means;
   temperature coefficient calculating means for calculating a temperature coefficient dependent on the temperature of said steering force transmitting system based on the temperature signal from said temperature detecting means;
   road load correcting means for calculating a corrected road load component by multiplying the road load component calculated by said road load calculating means and the temperature coefficient calculated by said temperature coefficient calculating means; and corrected steering force determining means for determining said corrected steering force by adding the corrected road load component calculated by said road load correced means and the temperature-dependent frictional resistance component calculated by said second frictional resistance determining means.

4. A motor-operated power steering apparatus according to claim 2, wherein, in a prescribed temperature range (0° C.<$\theta$1<$\theta$2) of said steering force transmitting system, said temperature coefficient calculated by said temperature coefficient calculating means is 1 when the temperature in said steering force transmitting system ranges from 0° C. to a first temperature $\theta$1, decreases as the temperature increases when the temperature in said steering force transmitting system ranges from the first temperature $\theta$1 to a second temperature $\theta$1, and is 0 when the temperature in said steering force transmitting system is the second temperature $\theta$2.

5. A motor-operated power steering apparatus comprising:
a rack casing;
an auxiliary casing fixed to one end of said rack casing;
a rack shaft with opposite ends operatively coupled to dirigible wheels, said rack shaft being axially movably supported in said rack casing and said auxiliary casing;
a pinion shaft operatively coupled to a steering wheel and meshing with said rack shaft within said auxiliary casing;
a steering torque sensor disposed in said auxiliary casing for detecting a steering force in a steering force transmitting system;
an electric motor disposed in said rack casing and on said rack shaft;
a screw shaft operatively coupled to said electric motor in said rack casing and rotatably said electric motor;
a rack holder fixed to said rack shaft in said rack casing and operatively coupled to said screw shaft through a ball screw mechanism;
a temperature sensor disposed near said electric motor in said rack casing for detecting the temperature in said rack casing; and
a control unit disposed in said auxiliary casing for controlling said electric motor according to the steering force detected by said steering torque sensor and the temperature detected by said temperature sensor.

6. A motor-operated power steering apparatus according to claim 5, wherein said control unit comprises:
control means for correcting the steering force detected by said steering torque sensor with the temperature detected by said temperature sensor to calculate a corrected steering force, and for determining a target current to be supplied to said electric motor based on said corrected steering force and generating a target current control signal indicative of said target current.

7. A motor-operated power steering apparatus according to claim 6, wherein said control means comprising:
road load calculating means for calculating a road load component of the steering force in said steering force transmitting system based on the steering force detected by said steering torque sensor;
first frictional resistance calculating means for calculating a steering-force-dependent frictional resistance component in said steering force transmitting system based on the steering force detected by said steering torque sensor;
temperature coefficient calculating means for calculating a temperature coefficient dependent on the temperature of said steering force transmitting system based on the temperature detected by said temperature sensor;
road load correcting means for calculating a corrected road load component by multiplying the road load component calculated by said road load calculating means and the temperature coefficient calculated by said temperature coefficient calculating means; and
corrected steering force determining means for determining said corrected steering force by adding the corrected road load component calculated by said road load corrected means and the steering-force-dependent frictional resistance component calculated by said first frictional resistance determining means.

8. A motor-operated power steering apparatus according to claim 6, wherein said control means comprising:
road load calculating means for calculating a road load component of the steering force in said steering force transmitting system based on the steering force detected by said steering torque sensor;
second frictional resistance calculating means for calculating a temperature-dependent frictional resistance component due to temperature-dependent viscosity of lubricating oil in said steering force transmitting system based on the temperature detected by said temperature sensor;
temperature coefficient calculating means for calculating a temperature coefficient dependent on the temperature of said steering force transmitting system based on the temperature detected by said temperature sensor;
road load correcting means for calculating a corrected road load component by multiplying the road load component calculated by said road load calculating means and the temperature coefficient calculated by said temperature coefficient calculating means; and
corrected steering force determining means for determining said corrected steering force by adding the corrected road load component calculated by said road load corrected means and the temperature-dependent frictional resistance component calculated by said second frictional resistance determining means.

* * * * *